United States Patent
Chin et al.

(10) Patent No.: US 12,479,101 B2
(45) Date of Patent: Nov. 25, 2025

(54) REPETITIVE TASK AND CONTEXTUAL RISK ANALYTICS FOR HUMAN-ROBOT COLLABORATION

(71) Applicant: Intel Corporation, Santa Clara, CA (US)

(72) Inventors: Siew Wen Chin, Penang (MY); Ralf Graefe, Haar (DE); Neslihan Kose Cihangir, Munich (DE); Sangeeta Manepalli, Chandler, AZ (US); Hassnaa Moustafa, San Jose, CA (US); Yang Peng, Munich (DE); Rafael Rosales, Unterhaching (DE); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 17/553,860

(22) Filed: Dec. 17, 2021

(65) Prior Publication Data

US 2022/0105635 A1    Apr. 7, 2022

(51) Int. Cl.
*B25J 9/16* (2006.01)
*G06Q 10/0631* (2023.01)
*G06Q 10/0639* (2023.01)

(52) U.S. Cl.
CPC .............. *B25J 9/1676* (2013.01); *B25J 9/163* (2013.01); *B25J 9/1651* (2013.01); *B25J 9/1666* (2013.01);
(Continued)

(58) Field of Classification Search
CPC ........ B25J 9/1676; B25J 9/163; B25J 9/1651; B25J 9/1666; G06Q 10/063114;
(Continued)

(56) References Cited

U.S. PATENT DOCUMENTS 8,055,383 B2 * 11/2011 Yoshizawa ............. B25J 9/1664
                                                               901/14
10,131,053 B1 * 11/2018 Sampedro ............. B25J 9/1666
(Continued)

FOREIGN PATENT DOCUMENTS

WO    2009001550 A1    12/2008
WO    2014048444 A1    4/2014

OTHER PUBLICATIONS

Ranz, Fabian, Vera Hummel, and Wilfried Sihn. "Capability-based task allocation in human-robot collaboration." Procedia manufacturing 9 (2017): 182-189 (Year: 2017).*
Extended European search report issued for the corresponding European patent application No. EP22200521.7, dated Apr. 18, 2023, 15 pages (for informational purposes only).
(Continued)

*Primary Examiner* — Adam R Mott
*Assistant Examiner* — Matthew C Gammon
(74) *Attorney, Agent, or Firm* — Viering, Jentschura & Partner mbB

(57) ABSTRACT

Disclosed herein are systems, devices, and methods of a robot safety system for improving the safety of human-robot collaborations. The robot safety system may include a processor that receives a collaboration policy for task collaboration between a robot and a collaborator. The task collaboration may include a movement plan of the robot to move a manipulator to a collaboration position. The robot safety system may also determine a new collaboration position based on the collaboration policy. The robot safety system may also update the collaboration position of the movement plan to the new collaboration position.

22 Claims, 7 Drawing Sheets

(52) U.S. Cl.
CPC ........... *G06Q 10/063114* (2013.01); *G06Q 10/06316* (2013.01); *G06Q 10/06398* (2013.01)

(58) Field of Classification Search
CPC ....... G06Q 10/06316; G06Q 10/06398; G05B 2219/40202
See application file for complete search history.

(56) References Cited

U.S. PATENT DOCUMENTS

| | | | |
|---|---|---|---|
| 2010/0087955 A1 | 4/2010 | Tsusaka et al. | |
| 2018/0117766 A1* | 5/2018 | Atohira | B25J 9/1671 |
| 2019/0105779 A1* | 4/2019 | Einav | B25J 9/1689 |
| 2021/0146546 A1 | 5/2021 | Linkowski et al. | |
| 2021/0205995 A1 | 7/2021 | Vu et al. | |
| 2022/0048707 A1* | 2/2022 | Matl | B65G 1/1373 |
| 2022/0391801 A1* | 12/2022 | Kober | G06Q 10/06398 |
| 2024/0131702 A1* | 4/2024 | Huang | B25J 9/1653 |

OTHER PUBLICATIONS

Alex Owen-Hill, "What Makes Collaborative Robots Ergonomic?", https://blog.robotiq.com/what-makes-collaborative-robots-ergonomic, retrieved on Nov. 2, 2021; 10 pages.

R. Sosa et al., "Robot ergonomics: Towards human-centred and robot-inclusive design", 15th International Design Conference, Jan. 2018, pp. 2323-2334.

J. D. Ortega et al., "DMD: A Large-Scale Multi-Modal Driver Monitoring Dataset for Attention and Alertness Analysis", Proc. of European Conference on Computer Vision (ECCVW), 2020, 18 pages.

Fabian Ranz et al., "Capability-based task allocation in human-robot collaboration", https://www.sciencedirect.com/science/article/pii/S235197891, 7th Conference on Learning Factories; CLF 2017, 2017, pp. 182-189, Elsevier.

Anh Vo Ngoc Tram et al., "Optimal Task Allocation in Human-Robotic Assembly Processes", 2020 5th International Conference on Robotics and Automation Engineering, pp. 158-162, IEEE, Nov. 20-22, 2020, Singapore.

* cited by examiner

REPETITIVE TASK AND CONTEXTUAL RISK ANALYTICS FOR HUMAN-ROBOT COLLABORATION

TECHNICAL FIELD

The disclosure relates generally to human and robot interactions, and in particular, to systems, devices, and methods for human safety in environments where robots and humans may collaborate together or near each other to accomplish work tasks.

BACKGROUND

Autonomous robots are becoming increasingly widespread in work and personal environments. In work environments, robots and humans may work together to accomplish collaborative tasks. Such collaborative tasks may include repetitive movements, where the robot and human each perform a repetitive task in concert with the other: a robot action is followed by a human action, and then it repeats. Additionally, such collaborative tasks may include mission-oriented collaboration, where the robot and human divide-up a larger goal in to smaller subtasks. With these types of collaborations comes an increased risk to the humans that collaborate with such robots. While robots may generally be able to work with fast, continuous, and reliable motions over long periods of time, a human collaborator may not be able to match. In addition, a human's output, efficiency, and reliability may change frequently, suddenly, and/or unexpectedly. Such human shortcomings and inconsistencies may negatively impact the human-robot collaboration, not only in terms of a risk that the collaboration will fail to accomplish the larger mission-oriented goal, but also in terms of safety risks for humans. In addition, while a robot's consistency may seem advantageous, it may cause problems for collaborating humans, where the repetitive nature of a task may cause repetitive stress injuries for the human.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
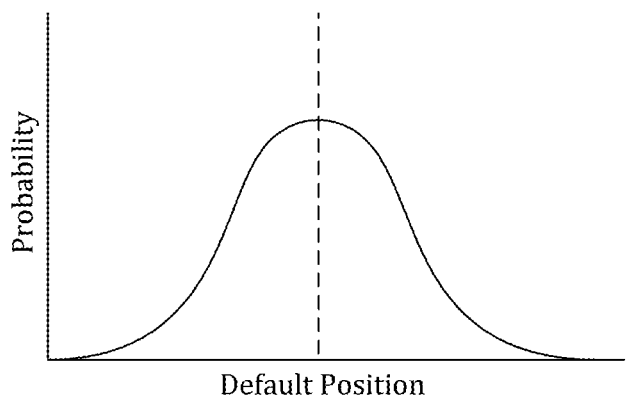
FIG. 1 shows an exemplary probability distribution associated with movement variations.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. In addition, reference is made herein to a "human," a "person," or a "collaborator" that may collaborate or share a space with a robot.

When robots and humans collaborate together to accomplish a common goal, there is an increased risk to the human's safety and to the safety of those near the collaboration environment. Because robots are generally able to work with fast, continuous, and reliable motions over long periods of time, many collaboration environments (e.g., a factory, a warehouse, etc.) may expect the same precision, speed, and reliability from a human collaborator. However, such repetitive motion may be harmful to humans in terms or repetitive stress injuries, fatigue, boredom, etc. In addition, a human worker's output, efficiency, and reliability may change frequently, suddenly, and/or unexpectedly. Such human inconsistencies may create a risk that the collaboration will fail to accomplish the common goal, and worse, it may create serious safety risks for the human or others within the vicinity of the robot.

As should be apparent from the detailed disclosure below, the disclosed robot safety system may reduce the risks associated with repetitive motion when a human collaborates with a robot. As discussed below, the robot safety system makes dynamic adjustments to the collaboration (e.g., the location of an interaction) based on observations of the collaborating human in order to reduce the risk of repetitive stress injuries, fatigue, boredom, etc. Previous solutions tend to focus on the static ergonomics of a given task, where the physical layout of the work area may be designed to reduce such injuries (e.g., building the conveyor belt at the optimal height, providing a comfortable seat for the human collaborator, etc.), or where collaborating humans are provided with a scheduled break at regular intervals. In contrast to these static methods, the improved robot safety system discussed in detail below provides a dynamic approach to repetitive tasks that may proactively address the repetitive nature of the task and/or revise the task based on observations (e.g., fatigue, posture, task errors) of the human collaborator in order to reduce the risk of musculoskeletal disorders and other repetitive stress injuries.

According to certain aspects, the disclosed robot safety system may operate in various collaboration modes, or a combination thereof, in order to adjust the way in which the robot interacts with the human during a collaborative task, where the nature of the collaboration usually involves a collaboration position where the robot and human will interact. For example, in the context of a manufacturing line, the collaborative task may be one where the robot picks/places an item at a specific location, and the human responds by inspecting or working on the placed item. Then, the robot picks/places the next item, and the human inspects or works on the new item, and the process is repeated.

Figure 2:
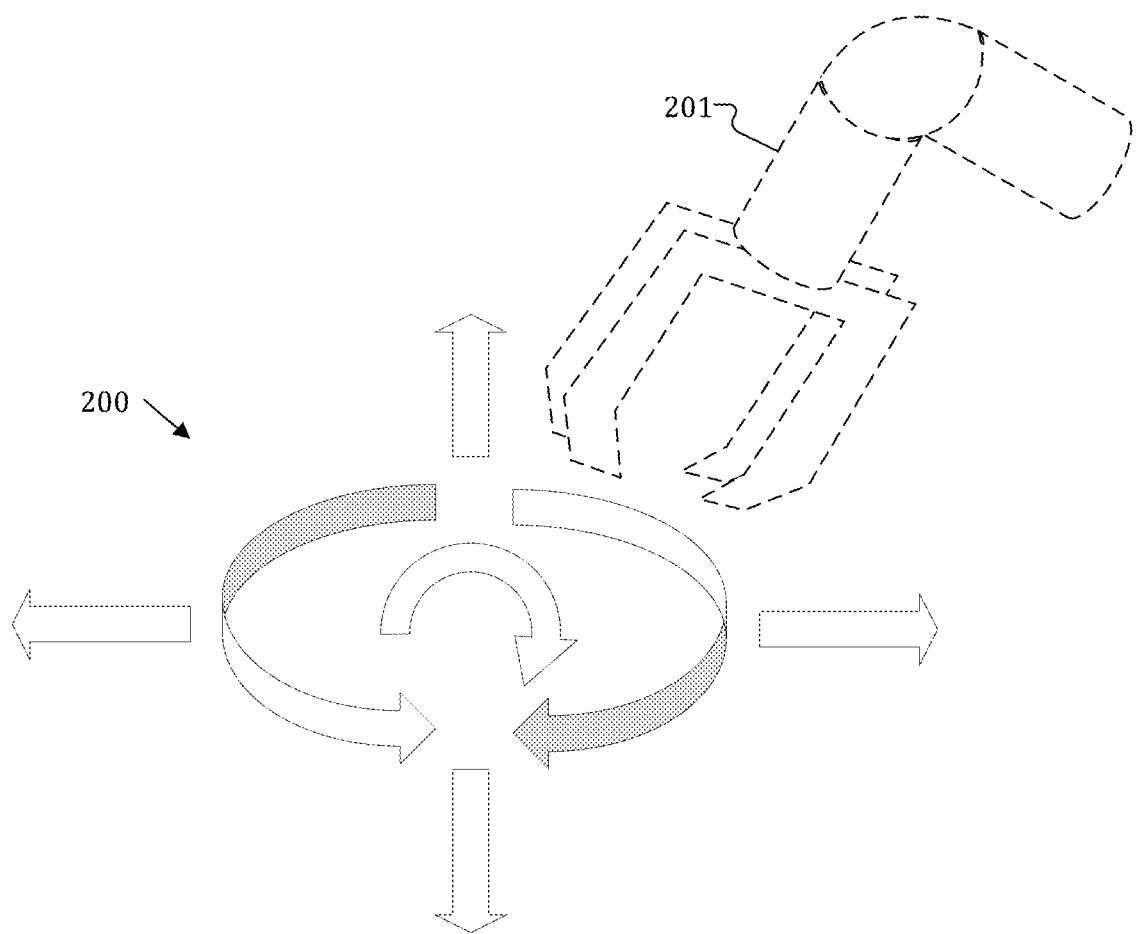
FIG. 2 shows an exemplary robot manipulator that may be associated with numerous degrees of freedom of movement.

The robot safety system may operate according to several non-exclusive collaboration policies, including a randomization policy, a monitoring policy, and/or a heuristic policy. While each policy will be discussed in more detail below in association with the figures, in general, the randomization policy may generate a movement plan that provides a random distribution (e.g., randomly within an predefined area for collaboration) for the various degrees of freedom that may be available for the robot in terms of placement location, manipulator position, etc. An exemplary random distribution is shown in FIG. 1, where the probability of a position (plotted on the Y-axis) is plotted as a function of the variation around a default position (plotted on the X-axis) and shows a typical gaussian distribution. This type of random distribution in a variation around a default position may be applied to any of the degrees of freedom associated with the robot's task movements. As shown in FIG. 2, for example, the collaborating robot may use a multi jointed manipulator 201 for tasks, where the manipulator 201 may have numerous degrees of freedom, as shown by the direction arrows 200 for direction, pitch, roll, yaw, etc.. Each degree of freedom may have its own variation, its own default position, its own predefined area, and may be randomly varied as part of a random distribution movement plan.

The monitoring policy may make observations of the human (e.g., monitoring the human's state of health) to determine a risk score associated with the observations and dynamically adjust the movement plan based on the observations and risk score. The monitoring policy may use any number of observations to determine the risk score, where the risk score may be indicative of an occupational safety of the collaborator during the task collaboration. For example, a low risk score may suggest a low occupational safety risk (e.g., a low risk of injury), whereas a high risk score may suggest a high occupational safety risk (e.g., a high risk of injury). Observations associated with lower risk scores may include, for example, healthy movements defined for the task (e.g., an appropriate wrist angle, the correct distance of the hands from the center of the body center, a proper angle of the elbow, an appropriate head pose, a properly balanced stance), whereas unhealthy movements may be associated with higher risk scores. Observations associated with higher risk scores may also include, for example, observations of a human's overexertion, fatigue, and/or distraction. As should be appreciated, the monitoring policy may be personalized to a particular individual, as the monitoring policy may learn their typical movements over time.

The heuristic policy may use a predefined strategy for providing variations to the collaboration location (also referred to as a collaboration position) and, more broadly, the human-robot interaction. The predefined strategy, for example, may include a predefined distribution at different heights, where the heights may be based on observations of the human. Or, the predefined strategy may include, a predefined multimodal pattern that may have discrete collaboration locations that may be, for example, spaced apart by a distance (e.g., one position for the human's left hand and one position for the human's right hand), and a change from a discrete location to the next discrete location may be time-based or triggered by any number of observed events, and may be associated with an indicator (e.g., a warning light, an audible message, a displayed message, etc.) to alert the human operator to the changed location. In addition, the predefined strategy may include a set of predefined movements that the human mimics (e.g., like a fitness trainer demonstrating a yoga pose that the trainee is supposed to mimic).

Figure 3:
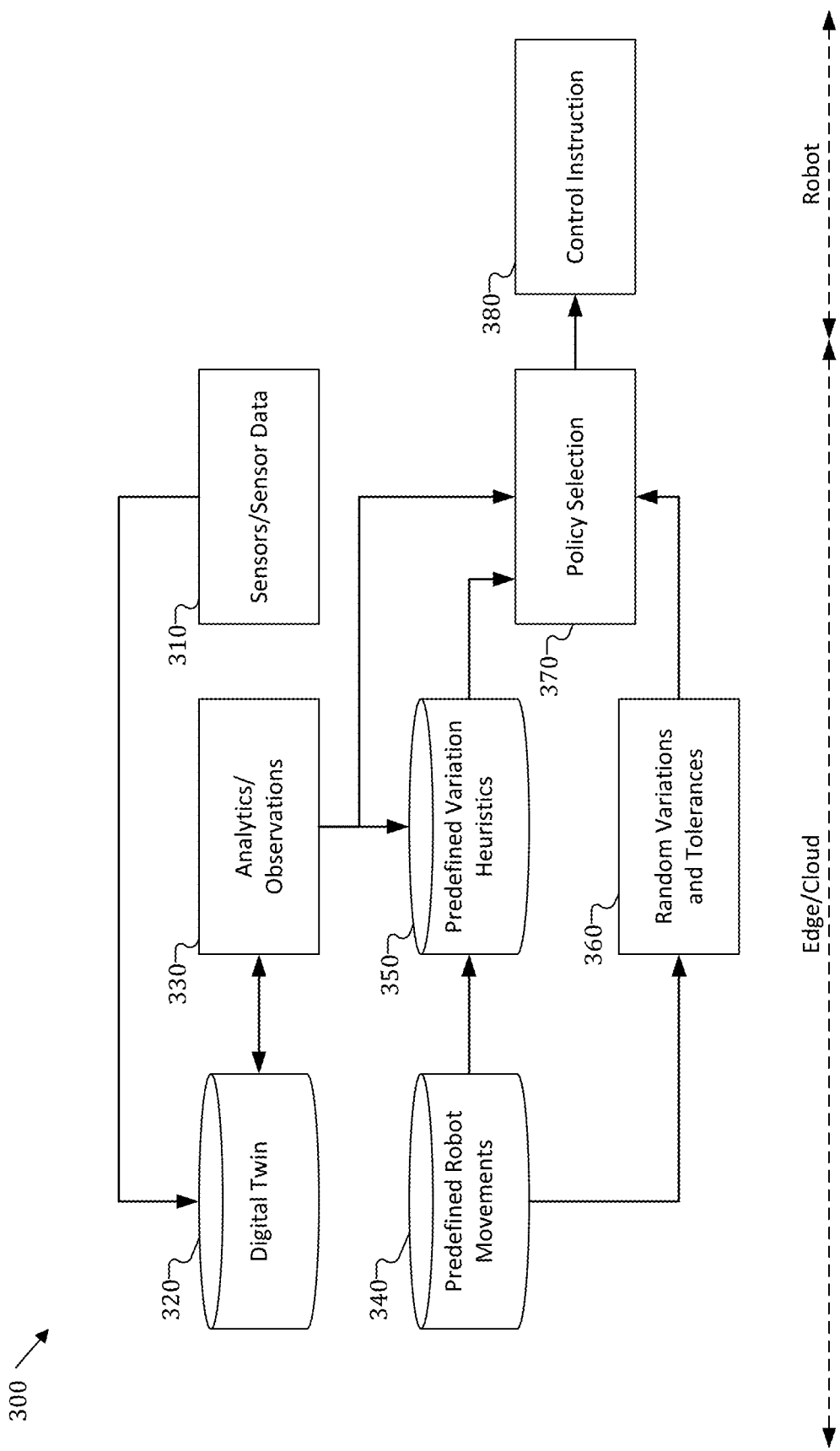
FIG. 3 shows an exemplary robot safety system for improving the safety of human-robot collaborative tasks.

FIG. 3 shows a robot safety system 300 for improving the safety of human-robot collaborative tasks. Robot safety system 300 may determine collaboration positions for moving a robot's manipulator (e.g., manipulator 201 shown in FIG. 2) to a collaboration position based on a collaboration policy. Robot safety system 300 may be implemented as a device with a processor that is configured to operate as described herein. The device may operate as part of a server that is remote to the robot (e.g., one an edge- or cloud-based server), may be integrated into the robot, and/or may have processing/sensors that are distributed across various locations. While FIG. 3 shows one implementation where various subsystems may be located on the edge/cloud (e.g., shown on the left-hand side of FIG. 3) and other subsystems may be located on the robot (e.g., shown on the right-hand side of FIG. 3), this representation is not intended to be limiting, and any of the depicted subsystems may be distributed in any manner across various locations. As should be appreciated, the robot safety system 300 may also include a receiver, transmitter, and/or transceiver for communicating information among the various processing locations (e.g., between the edge and the robot, between a sensor and the edge, between one robot and another robot, etc.).

Robot safety system 300 may receive (e.g., via a receiver) sensor information from a sensor subsystem 310 that may include sensors that monitor the collaboration environment (e.g., the robot, the human, and/or other objects in or near the space available for collaboration). Such sensors may include, as examples, a depth sensor, a camera, a radar, a light ranging and detection (LiDAR) sensor, a microphone, a health-monitoring sensor (e.g., a heart-rate monitor), a motion sensor, a gyroscopic sensor, an accelerometer, and/or an ultrasonic senor. As should be appreciated, sensor subsystem 310 may utilize any type of sensor, and the sensor may be part of robot safety system 300, remote to robot safety system 300, part of the robot, attached to the human, and/or distributed among any number of sensors and any number of sensing locations. For example, a camera may be at a fixed location of a manufacturing facility that is able to monitor the activities on the manufacturing floor, including the robots and humans that is engaged in tasks and/or moving about the manufacturing floor. A camera may also be part of or attached to the robot, where such a camera is able to observe the immediate environment of the robot. As another example, a human may wear a health-monitoring sensor such as a wearable heart-rate monitor that is able to record the heart rate of the human wearing the sensor. As another example, a microphone may be present at the collaboration space or within the manufacturing facility that is able to detect and localize sounds emitted within the environment.

Robot safety system 300 may store the sensor information from sensor subsystem 310 in a digital twin 320. The digital twin 320 may simply be a copy of the sensor data, or it may be an anonymized version of the sensor data that has removed any privacy-related information that the sensor system 310 may have collected. Robot safety system 300 may use the digital twin 320 in an analytics module 330 that may fuse the sensor data in the digital twin 320 to make observations about the collaboration environment. Such observations may include, for example, facial expressions of the collaborator, emotion recognition of the collaborator, speech recognition of the collaborator, sound classification of environmental sounds at the collaboration site, health monitoring of the collaborator, an identification of the collaborator, a distraction level of the collaborator, a response time of the collaborator, or other observations (e.g., movements, postures, etc.) of the collaborator that may evidence unhealthy movements (e.g., repetitive motions) or unhealthy states (e.g., exhaustion, fatigue, distraction, etc.) during the collaboration.

Robot safety system 300 may provide the determined analytics and observations from analytics module 330 to the policy selection module 370 for determining the movement plan for the robot's interaction with the human for the collaboration task. As noted earlier, robot safety system 300 may employ a number of different collaboration policies for determining the movement plan, and the policy selection module 370 may utilize the analytics and observations to determine the movement plan, as discussed above, for example with respect to the monitoring policy and/or the heuristic policy. As also noted above, the robot safety system 300 may use a randomization policy that may, but need not necessarily, depend on the analytics and observations. As shown in FIG. 3, the randomization module 360 may generate a movement plan that provides a random distribution from among a set of predefined robot movements 340. For example, the movement plan may be associated with the random distribution for the various degrees of freedom that may be available for the robot's movements in terms of placement location, manipulator position, etc.

Randomization module 360 may randomize the movement plan to provide a random distribution of movement variations around a default position, and the randomization module 360 may randomize any movements along any of the degrees of freedom associated with the robot's predefined robot movements 340 (e.g., for a multi jointed manipulator 201 with variable direction, pitch, roll, yaw, etc. as depicted in FIG. 2). Each degree of freedom may have its own variation, its own default position, and its own predefined area, and the randomization module 360 may randomly vary the adjustment as part of a random distribution movement plan.

The randomization module 360 may distribute the actual end position within bounded ranges according to any type of distribution for a given variation (e.g., distributed equally between a minimum and a maximum or distributed using a predefined distribution such as a gaussian distribution between a minimum and a maximum). A gaussian distribution may provide an advantage in that the variations remain centered around the default position (e.g., a higher probability that the position will be close to the default position). As should be appreciated, the distribution may also be a multimodal distribution, where the distributions is centered around multiple default positions (e.g., two or more default positions). As should also be appreciated, each degree of freedom may be associated with a different type of distribution (e.g., adjustments to movements in the up and down direction follow a uniform distribution while adjustments to movements along pitch, role, and yaw follow a gaussian distribution).

Apart from a randomization of the predefined robot movements 340, returning to the policy selection module 370 of FIG. 3, the policy selection module 370 may utilize the analytics and observations (e.g., from analytics module 330 discussed earlier) to adjust the movement plan, using the monitoring policy and/or the heuristic policy. As described above, the monitoring policy may dynamically adjust the movement plan based on the observations and an associated risk score indicative of an occupational safety of the collaborator during the task collaboration. For example, policy selection module 370 may utilize a machine learning model to maintain and update the digital twin 320, which may associate the analytics and observations with a corresponding weight indicating its impact on the risk score. For example, as discussed above, certain observations may increase the risk score (e.g., observations of distraction, high levels of exertion, poor posture, tiredness, etc.) while other observations may decrease the risk score (e.g., observations of attentiveness, eye contact with the robot's manipulator, alertness, correct posture, etc.).

As should be appreciated, the machine learning model may be both reactive and proactive. The machine learning model may be reactive in that the observations may be associated with detecting human behaviors that are currently injury-inducing (e.g., a slouching posture that puts too much stress on the human's back muscles) or it may be proactive in that machine learning model uses advanced indicators of human behaviors that may have a tendency to eventually lead to dangerous situations (e.g., the blink-rate begins to degrease, suggesting that a distracted or fatigued movement may be imminent). The machine learning model may use any number of observations, including any of the observations discussed above. As should be appreciated, the robot safety system 300 may store the digital twin 320 and the associated machine learning model in memory.

The monitoring policy may be based on observations that the robot safety system 300 continuously updates (e.g., in real-time, according to a regular or irregular schedule, when triggered by an event, etc.). In this manner, policy selection module 370 may select movement variations to the predefined robot movements 340 based on the current observations of the human and the current risk score. In this manner, as the human's behaviors change, the policy selection module 370 may likewise adjust the manner, extent, and frequency of the movement variations to match the associated observation and risk level (e.g., risk score). For example, the policy selection module 370 may make minor adjustments to the movement plan until the human's body posture improves and the associated observations yield a lower risk score, whereupon the movement plan may return to default movements. On the other hand, if the updated observations reveal an increasing risk score and/or a critically unsafe behavior of the human, the robot may slow down, pause, or stop its movements entirely, until the observations of the human are no longer critical or until a supervisor approves resumption of the collaboration.

In addition to a randomization policy and a monitoring policy, the policy selection module 370 may apply a heuristic policy using the predefined variation heuristics 350, which may depend on the analytics and observations (e.g., from analytics module 330 discussed earlier). As described above, the predefined variation heuristics 350 may be a predefined strategy for providing variations to the robot's movement plan. The predefined strategy, for example, may include a predefined distribution at different heights, where the heights may be based on observations of the human (e.g., a height of the human, an arm length of the human, etc.). As another example, the predefined strategy may include, a predefined multimodal pattern that may have discrete collaboration locations that may be, for example, spaced apart by a distance (e.g., one position for the human's left hand and one position for the human's right hand), which change from a discrete location to the next discrete location based on the observations or based on a trigger (e.g., time-based, event-based, etc.) and include an informational alert to the human about to the change. In addition, the predefined strategy may include a set of predefined movements that the human mimics (e.g., like a fitness trainer demonstrating a yoga pose that the trainee is to mimic). For example, a "fitness trainer" predefined strategy may include predefined movements designed to demonstrate "exercises" for the human to mimic, or it may include predefined manipulator positions that the human is designed to reach toward or grasp in order to stretch or relax certain muscles. Of course, predefined strategy may include any type of predefined exercise routine. In addition, the robot safety system 300 may also monitor observations of the human to confirm whether the human has completed the exercise routine and/or whether the exercises have reduced the current risk score to an acceptable threshold level.

The robot safety system 300 may also observe, monitor, and control multiple robots and/or multiple collaboration tasks, where one or more robots may be collaborating with one or more humans in a number of tasks, where one task may depend on another task. In this case, robot safety system 300 may coordinate the observations, tasks, and adjusted movements in a way that may optimize interconnected collaborations. For example, the robot safety system 300 may optimize the collaboration so as to minimize the risk of human injury while also maximizing the task completion rate.

As one example, assume the robot safety system 300 is observing, monitoring, and controlling three robots (e.g., robot A, robot B, and robot C), each of which are collaborating with a corresponding human (e.g., human A, human B, and human C) on a corresponding task (e.g., task A, task B, and task C) to achieve an overall goal. Also assume that task C may start only after completion of task A and task B. In such a situation, if the robot safety system 300 makes adjustments to the movement plans of task A or task B, it may impact task C and the overall production level (e.g., task completion rate, throughput, etc.). Therefore, the robot safety system 300 may make adjustments to each of the robot's movement plans based on the impact to each of the other robot's movement plans and/or based on the impact to the overall goal. For example, if the robot safety system 300 observes that human A is losing attention or has performed repetitive motions for a dangerously-long time period, the robot safety system 300 edge may select new tasks for robot A and/or robot B to reduce the risk of injury to human A, with the goal of limiting the impact to the completion efficiency of the overall goal. For example, the robot safety system 300 may determine that while slowing robot A may improve human A's occupational safety, it may have too large of an impact on task B and task C, leading to too large of a reduction in completion efficiency of the overall goal as compared to the task-switching solution described above.

Figures 4A, 4B:
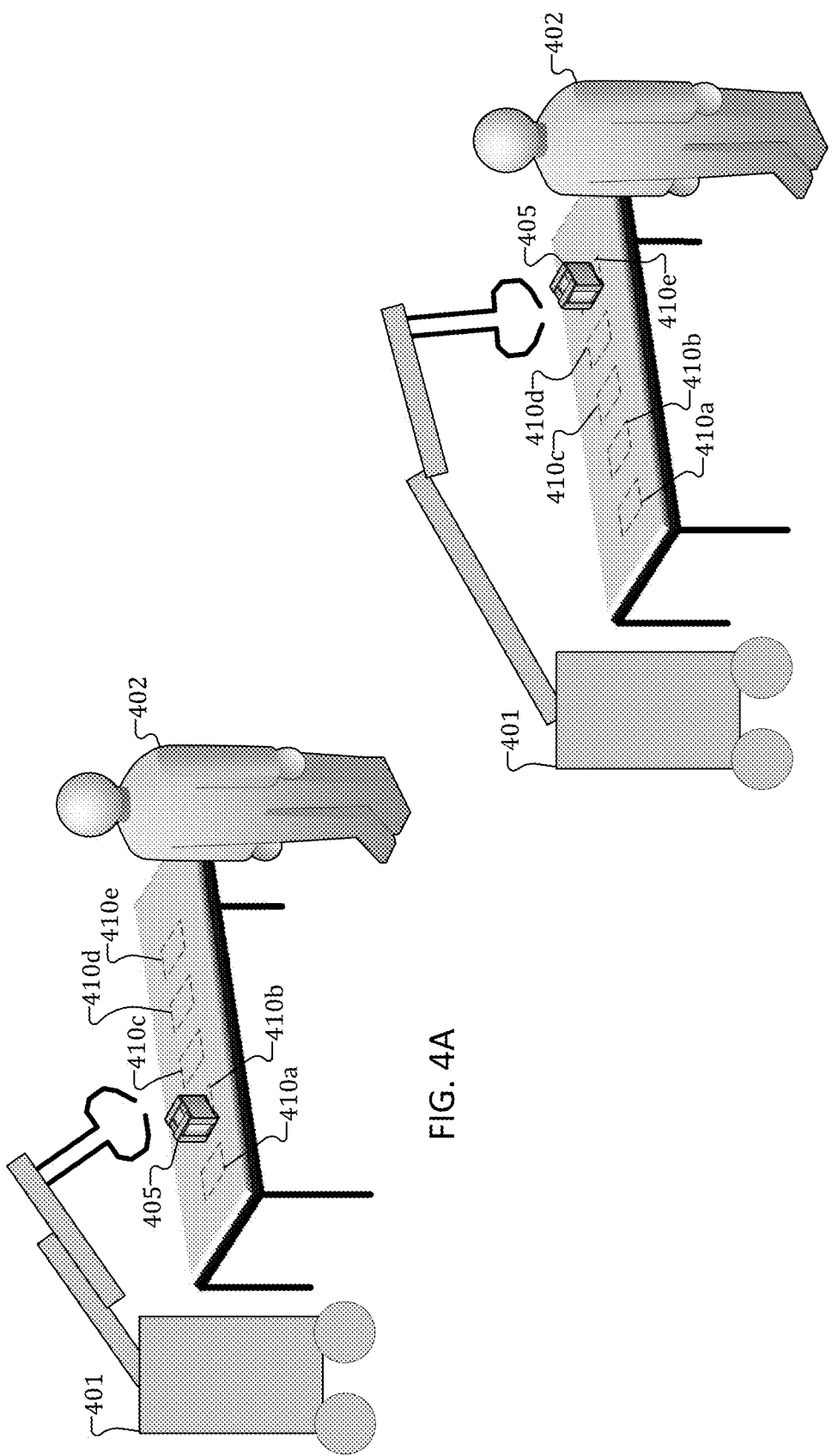
FIGS. 4A and 4B show exemplary illustrations of how a robot safety system may adjust the movement plan of a robot collaborating with a human.

FIGS. 4A-4B illustrate how a robot safety system (e.g., robot safety system 300) may adjust the movement plan of a robot according to a collaboration policy. As shown in FIGS. 4A-4B, robot 401 may collaborate with human 402 to place object 405 at a collaboration location where human 402 inspects the placed object 405. The robot 401 may move arms, wheels, and/or manipulators that it may adjust according to a collaboration policy so the robot 401 places object 405 at different collaboration positions 410*a*, 410*b*, 410*c*, 410*d*, or 410*e*. As should be appreciated, collaboration positions 410*a*, 410*b*, 410*c*, 410*d*, or 410*e* are exemplary and may a collaboration position may correspond to any location or range of locations and need not be distinct locations as shown. As shown in FIG. 4A, robot 401 has placed object 405 at collaboration position 410*b* during a first execution of the task, and for the next execution shown in FIG. 4B, robot 401 has placed object 405 at collaboration position 410*e*. This change in location may depend on the collaboration policy.

If the robot safety system in FIGS. 4A-4B is implementing a randomization policy, for example, the robot safety system may randomize the movements of the robot such that the collaboration location is randomly selected from among the collaboration positions 410*a*, 410*b*, 410*c*, 410*d*, and 410*e*, where, for example, collaboration position 410*c* may be the default location and the randomized distribution may be, as examples, a gaussian distribution or an equal distribution among the collaboration positions 410*a*, 410*b*, 410*c*, 410*d*, and 410*e*. Thus, the change in location from collaboration position 410*b* in FIG. 4A to collaboration position 410*e* in FIG. 4B may be due to the randomized movements of the robot's movement plan.

If the robot safety system in FIGS. 4A-4B is implementing a monitoring policy, for example, the robot safety system may have detected an observation of the human and/or may have calculated a risk score based on observation(s) that exceeds a predetermined safety threshold. Thus, the change in location from collaboration position 410*b* in FIG. 4A to collaboration position 410*e* in FIG. 4B may be due to the observations and/or risk score of the human.

If the robot safety system in FIGS. 4A-4B is implementing a heuristic policy, for example, the robot safety system may have a predefined variation heuristic that is designed to select collaboration positions 410*d* and 410*e* if the human 402 has short arms and designed to select collaboration positions 410*b* and 410*e* if the human 402 has long arms. Thus, the selection of collaboration positions of 410*b* in FIG. 4A and collaboration position 410*e* in FIG. 4B may be due to an observation of the human 402 as having long arms. As should be appreciated, the depiction in FIGS. 4A-4B, the collaboration policies, and the associated adjustments to movement plans described above are merely exemplary and are not intended to limit robot safety system 300.

Figure 5B:
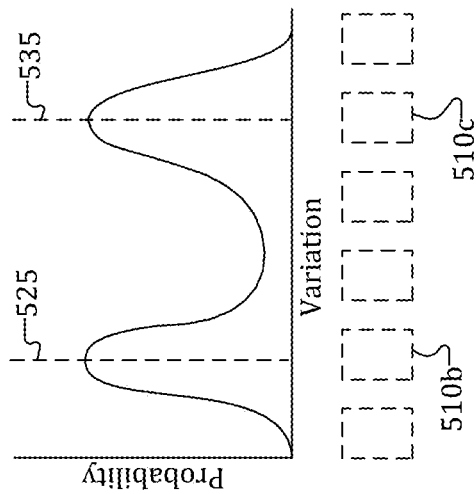
FIGS. 5A and 5B show exemplary illustrations and probability distributions for adjustments to a movement plan of a robot collaborating with a human.
Figure 5A:
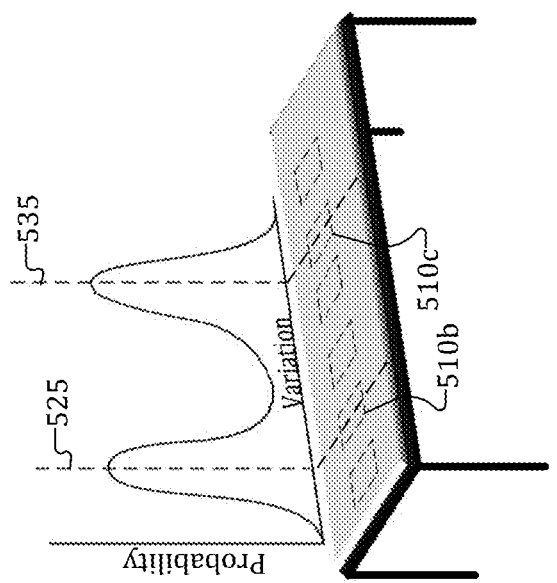

FIGS. 5A-5B illustrates another example for how a robot safety system (e.g., robot safety system 300) may adjust the movement plan of a robot according to a collaboration policy. FIG. 5A shows a perspective view while FIG. 5B shows a simplified non-perspective view of FIG. 5A. As shown in FIGS. 5A-5B the collaboration region may have different collaboration positions 510*a*, 510*b*, 510*c*, 510*d*, or 510*e*, and above the collaboration region, FIGS. 5A-5B each depict a probability chart associated with the collaboration region. According to the selected collaboration policy, collaboration position 510*b* may be a first default position and collaboration position 510*c* may be second default position, and the collaboration policy may call for a gaussian distribution in the movement plan around each of the two default positions. As shown in the probability chart, this is a multimodal randomization policy that may randomly distribute the collaboration regions around the first default location 525 and the second default location 535. As should be appreciated, the depiction in FIGS. 5A-5B are merely exemplary and are not intended to limit robot safety system 300.

Figure 6:
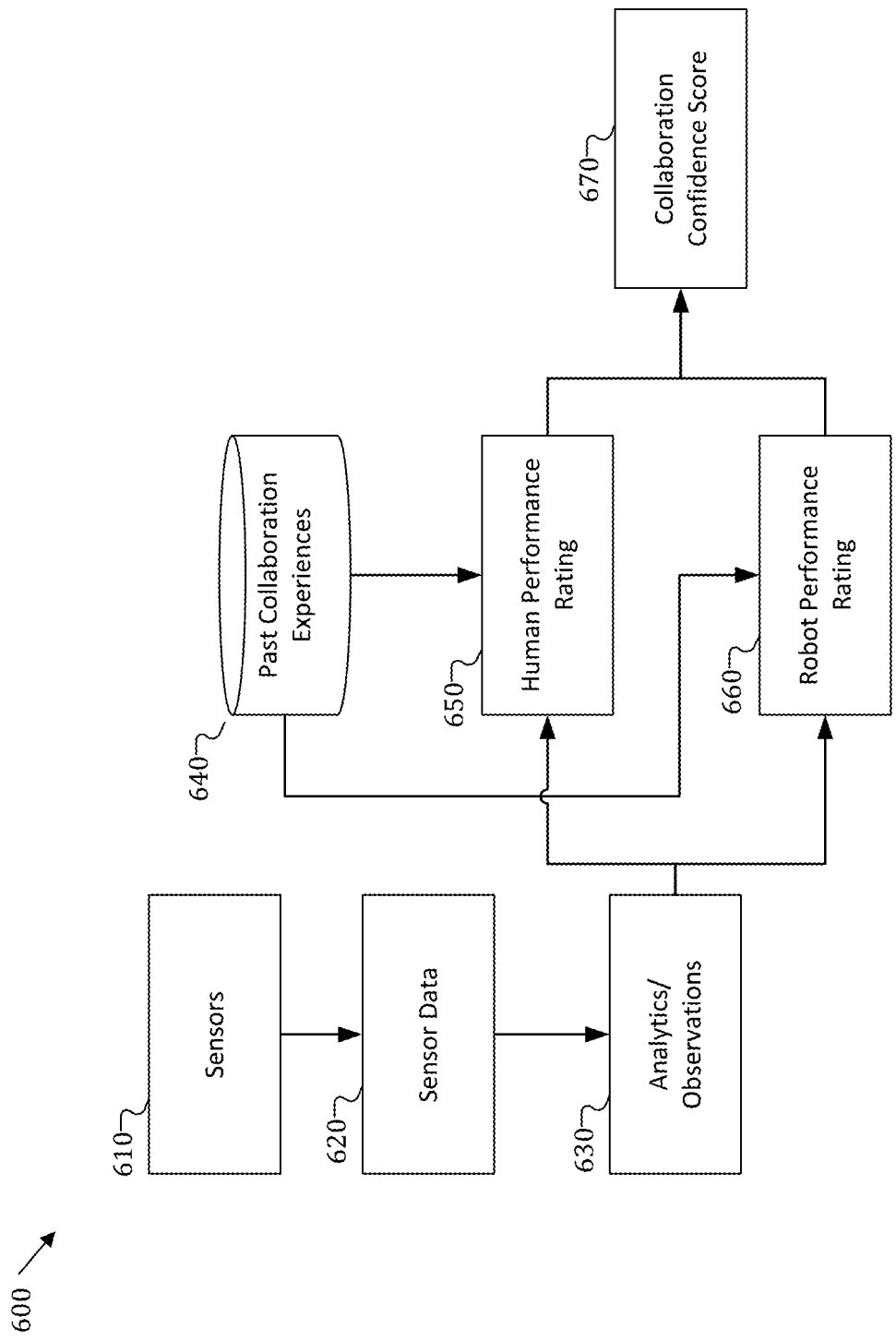
FIG. 6 shows an exemplary robot safety system for improving the safety of human-robot collaborative tasks.

FIG. 6 shows a robot safety system 600 for improving the safety of human-robot collaborative tasks. Without limitation, robot safety system 600 may be, may be part of, or may be complementary to robot safety system 300 described above. Aspects of robot safety system 600 described below may be particularly applicable to mission-oriented human-robot collaboration, where the robot and the human may divide-up smaller subtasks in order to accomplish a larger goal/mission. Robot safety system 600 may observe the environment (e.g., the robot, the human, and/or other objects in or near the space available for collaboration) in order to assess the performance of the robot and human in completing tasks (e.g., subtasks) toward accomplishing the common goal. Based on these observations, robot safety system 600 may alter the collaboration (e.g., redistribute subtasks between robot and human, alter the mission goal, adjust the way (e.g., speed, duty cycle, effort, etc.) in which the robot/human performs the subtasks. The robot safety system 600 may use a learning model for distributing tasks, where the learning model may associate an array of observations and a distribution of tasks with a given mission that the robot safety system 600 may use to find an optimal distribution of tasks (e.g., a distribution that may provide a high confidence that the human-robot collaboration will efficiently complete the mission). Robot safety system 600 may use these types of contextual risk analytics to dynamically optimize the collaboration (e.g., redistribute task) based on the observed environment and the human/robot performance ratings during the collaboration. In this sense, the robot safety system 600 may act like a coach of a sport team, adjusting each team member's roles, tasks, and participation based on their performances both individually for a given task and collectively toward the ultimate goal.

Robot safety system 600 may receive (e.g., via a receiver) sensor data 620 from a sensor subsystem 610 that may include sensors that monitor the collaboration environment (e.g., the robot, the human, and/or other objects in or near the space available for collaboration). Such sensors may include, as examples, a depth sensor, a camera, a radar, a light ranging and detection (LiDAR) sensor, a microphone, a health-monitoring sensor (e.g., a heart-rate monitor), a motion sensor, a gyroscopic sensor, an accelerometer, and/or an ultrasonic senor. As should be appreciated, sensor subsystem 610 may utilize any type of sensor, and the sensor may be part of robot safety system 600, remote to robot safety system 600, part of the robot, attached to the human, and/or distributed among any number of sensors and any number of sensing locations. Robot safety system 600 may use the sensor data 620 in an analytics module 630 that may fuse the sensor data 620 to make observations about the collaboration environment. While analytics module 630 may perform any type of observations/analytics on the sensor data 620, including those discussed above with respect to analytics module 330, additional examples are discussed below that may be particularly relevant to robot safety system 600.

For example, analytics module 630 may use the sensor data 620 for human activity monitoring. This may include sensor data from audio sensors, video sensors, health monitors, etc., which analytics module 630 may use to determine the human's emotions, reactions, state of health, etc. As another example, analytics module 630 may use the sensor data 620 for environmental monitoring, including for example, sensor data from air quality sensors, acoustic sensors, visual sensors, etc., which analytics module 630 may use to understand changes in the environment (e.g., listen for an alarm, screams, unexpected noises, unpleasant air quality, low light levels, etc.) that may impact the human's performance toward completing a task. As another example, analytics module 630 may use the sensor data 620 for robot activity monitoring. This may include sensor data from telemetry sensors, motion sensors, positioning sensors, cameras, etc., which analytics module 630 may use to understand functionality, operating status, and utilization of resources associated with a given task. As another example, analytics module 630 may use the sensor data 620 for scene monitoring by using, for example, cameras, or other visual sensors to analyze the scene for consistency and the gaps in the work pattern of collaborating robots/humans.

Robot safety system 600 may also include a human performance rating engine 650 and/or a robot performance rating engine 660. Each engine may utilize information from a past collaboration experiences database 640 to rate the performance of the robot/human based on the analytics/observations from the analytics module 630 and to generate a collaboration confidence score 670 for the current distribution of tasks. Based on the collaboration confidence score 670, the robot safety system 600 may redistribute tasks between robot and human, adjust the movement plan associated with the robot's task (e.g., provide instructions that slow down the robot, speed up the robot, etc.), and/or make other adjustments to the tasks in order to improve the confidence score.

The rating engines 650 and/or 660 may generate the confidence score based on any of the analytics/observations from the analytics module 630 as compared to the past collaboration experiences database 640 and their associated weightings. For example, the rating engines 650 and/or 660 may generate the collaboration score using the past time taken for the given collaboration distribution divided by the average risk score associated with the observations, which may also be expressed as an absolute difference between the projected time and the actual time to complete a task, multiplied by an associated weight from the learning model:

$$\frac{f(\text{past time taken})}{f(\text{average risk score})} = \frac{(|\text{projected time} - \text{actual time}| * \text{weight})}{\sum_0^n \text{risk score}(n)}$$

As should be appreciated, the above-listed formula is merely exemplary, and the formula for generating the confidence score may utilize any formula reflecting the confidence level that the human-robot collaboration will complete the task, based on any analytics/observations from the analytics module 630 as compared to the past collaboration experiences database 640 and their associated weightings. As should also be appreciated, the past collaboration experiences database 640 may be updated with new entries and/or updated weightings as the robot safety system 600 learns from observing actual collaborations between robots and humans, and in this sense, the robot safety system 600 may continuously update the past collaboration experiences database 640. As should be appreciated, the robot safety system 600 may store the past collaboration experiences database 640 and the associated machine learning model in memory.

In the tables that follow, an exemplary set of contextual data (e.g., sensor data associated with sensors for vision, audio, health, air quality, gas, and physical hazard detection) shows how such data may be associated with a particular risk category, threshold value for risk level (e.g., risk score), and recommended remedial action for the constellation of contextual data in the table. The robot safety system 600 may keep this type of information in the past collaboration experiences database 640.

Table 1 shows an exemplary set of contextual data, human observations, and analytics for an exemplary risk category of "Zero" that is associated with a threshold risk level of zero and a recommended remedial action to continue "Normal Operation."

TABLE 1

| Contextual Data | Human Observation | Analytic |
|---|---|---|
| Vision | Emotion analysis within expected range | No unidentified objects detected |
| Audio | — | No incidents identified in last 5-10 mins |
| Health | Health state analysis within expected range | — |
| Air Quality | — | Within expected ranges |
| Gas/Chemical | — | Within expected ranges |
| Physical Hazard | — | All operation areas clear |

Table 2 shows an exemplary set of contextual data, human observations, and analytics for an exemplary risk category of "One" that is associated with a low threshold risk level and a recommended remedial action to "Schedule an inspection, schedule maintenance, or replace human worker."

TABLE 2

| Contextual Data | Human Observation | Analytic |
|---|---|---|
| Vision | Emotion analysis within expected range | Robot or machine operation differences detected |

TABLE 2-continued

| Contextual Data | Human Observation | Analytic |
| --- | --- | --- |
| Audio | — | Loud noise detected, once in the last 5-10 minutes |
| Health | — | — |
| Air Quality | — | Potential humidity or temperature changes (+/−2 deg.) in operational areas |
| Gas/Chemical | — | — |
| Physical Hazard | — | — |

Table 3 shows an exemplary set of contextual data, human observations, and analytics for an exemplary risk category of "Two" that is associated with a medium threshold risk level and a recommended remedial action to "Pause operations and wait for inspection."

TABLE 3

| Contextual Data | Human Observation | Analytic |
| --- | --- | --- |
| Vision | Neutral to extreme emotion analysis variation in 5-10 minutes | Significant operation execution difference or non-compliance |
| Audio | — | Loud noises detected; more than one in the last 5-10 minutes |
| Health | Increased heart rate | — |
| Air Quality | — | Significant variation in humidity or temperature (5-10 deg.) in operational areas |
| Gas/Chemical | — | Chemical or gas sensor exceeds low threshold alert |
| Physical Hazard | — | Potential hazard detected which could impede operation |

Table 4 shows an exemplary set of contextual data, human observations, and analytics for an exemplary risk category of "Three" that is associated with a high threshold risk level and a recommended remedial action of "Abort Operation."

TABLE 4

| Contextual Data | Human Observation | Analytic |
| --- | --- | --- |
| Vision | Neutral to extreme emotion analysis variation in the last 5 minutes | Robots/machinery not operating as expected |
| Audio | — | Loud noise detected in the last 5 minutes |
| Health | Increased heart rate, high blood pressure, profusive sweating | — |
| Air Quality | — | Significant variation in humidity or temperature (>10 deg.) in operational areas |
| Gas/Chemical | — | Chemical or gas sensor exceeds high threshold alert |
| Physical Hazard | — | Potential hazards detected in multiple areas which could impede operation |

To understand the operation of robot safety system 600, the following example is provided regarding a human-robot collaboration to accomplish a goal of lifting equipment in a warehouse and picking/placing packages within the warehouse. The human may have the task of lifting equipment, and the robot may have the task of picking/placing the packages, both of which may occur simultaneously in the same vicinity. Robot safety system 600 may make observations about the human and robot to generate a confidence score based on these observations compared to past collaboration experiences (e.g., from past collaboration experiences database 640). For example, the robot safety system 600 may observe the speed, trajectory, and frequency of the human's lift operation as well as the robot's arrival/destinations for its picking/placing packages, the available pathways, and the robot's speed in picking/placing packages. The robot safety system 600 may compare these observations to the past collaboration experiences to determine a confidence level that the human and robot will be able to accomplish the common goal. If the confidence level is below a predefined threshold, the robot safety system 600 may generate a control instruction for the robot to modify its trajectory, change its speed, and/or change its timing to accommodate the observations of human's behavior.

If the robot safety system 600 is unable to find a suitable match to past collaboration experiences (e.g., in the past collaboration experiences database 640) for observations associated with the current job assignment and/or current set of human-robot collaborators, the robot safety system 600 may start with a confidence score of zero, meaning that the robot safety system may continuously monitor the collaboration in order to populate the past collaboration experiences database with current timings associated with current observations. The robot safety system 600 may adjust the task distribution in order to make new observations about new timings associated with the new task distribution. For example, for each successive collaboration, as the time to complete the goal improves, the robot safety system 600 may increase the confidence score associated with this particular constellation of observations. As the time to complete the goal worsens, the robot safety system 600 may decrease the confidence score associated with this particular constellation of observations. In this manner, the robot safety system 600 may train the past collaboration experiences database 640 with appropriate weights.

Figure 7:
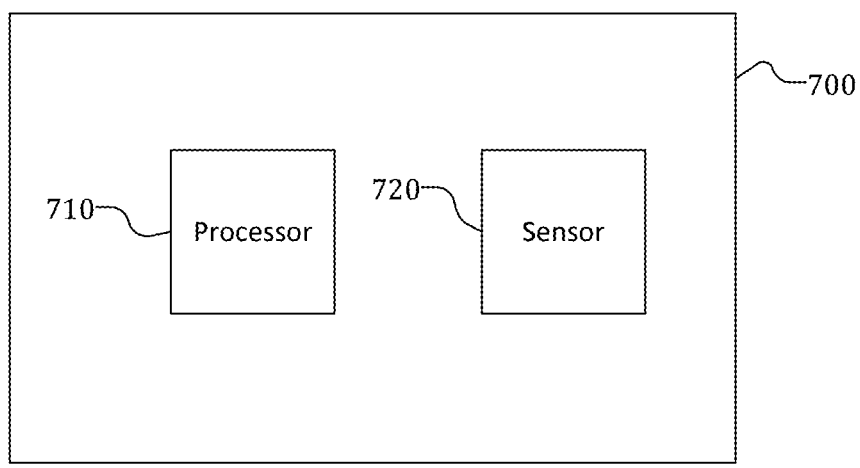
FIG. 7 illustrates an exemplary schematic drawing of a device for improving the safety of human-robot collaborative tasks.

FIG. 7 is a schematic drawing illustrating a device 700 for improving the safety of human-robot collaborative tasks. The device 700 may include any of the features discussed above with respect to robot safety system 300 and/or robot safety system 600. FIG. 7 may be implemented as a device, a system, a method, and/or a computer readable medium that, when executed, performs the features of the robot safety systems described above. It should be understood that device 700 is only an example, and other configurations may be possible that include, for example, different components or additional components.

Device 700 includes a processor 710 that is configured to receive a collaboration policy for task collaboration between a robot and a collaborator, wherein the task collaboration includes a movement plan of the robot to move a manipulator to a collaboration position. In addition to or in combination with any of the features described in this or the following paragraphs, processor 710 is further configured to determine a new collaboration position based on the collaboration policy. In addition to or in combination with any of the features described in this or the following paragraphs, processor 710 is further configured to update the collaboration position of the movement plan to the new collaboration position.

Furthermore, in addition to or in combination with any one of the features of this and/or the preceding paragraph with respect to device 700, the collaboration policy may include a randomization policy, wherein the processor 710 may be configured to select the new collaboration position from predetermined collaboration positions within a collaboration region defined by a spatial dimension corresponding to a degree of freedom of the manipulator. Furthermore, in addition to or in combination with any one of the features of this and/or the preceding paragraph, the processor 710 may be configured to select the new collaboration position based on a random distribution of the predetermined collaboration positions within the collaboration region. Furthermore, in addition to or in combination with any one of the features of this and/or the preceding paragraph, the random distribution may include an equal distribution of the predetermined collaboration positions along the spatial dimension from a maximum value of the spatial dimension to a minimum value of the spatial dimension. Furthermore, in addition to or in combination with any one of the features of this and/or the preceding paragraph, the random distribution may include a gaussian distribution of the predetermined collaboration positions along the spatial dimension from a maximum value of the spatial dimension to a minimum value of the spatial dimension.

Furthermore, in addition to or in combination with any one of the features of this and/or the preceding two paragraphs, the random distribution may include a multimodal distribution of the predetermined collaboration positions along the spatial dimension, centered at two different center positions along the spatial dimension. Furthermore, in addition to or in combination with any one of the features of this and/or the preceding two paragraphs, the collaboration region may be defined by a plurality of spatial dimensions, wherein each spatial dimension corresponds to a unique degree of freedom of the manipulator, and wherein the processor 710 may be configured to select the new collaboration position from the predetermined collaboration positions based on a random distribution of the predetermined collaboration positions along each spatial dimension of the plurality of spatial dimensions. Furthermore, in addition to or in combination with any one of the features of this and/or the preceding two paragraphs, the collaboration policy may include a monitoring policy, wherein the processor 710 may be configured to determine the new collaboration location based on a received observation of the collaborator during task collaboration.

Furthermore, in addition to or in combination with any one of the features of this and/or the preceding three paragraphs, the processor 710 configured to determine the new collaboration position based on the received observation of the collaborator may include the processor 710 configured to determine a risk score based on the received observation, wherein the risk score may be indicative of an occupational safety of the collaborator with respect to the task collaboration, wherein the processor 710 may be configured to select the new collaboration position based on the risk score. Furthermore, in addition to or in combination with any one of the features of this and/or the preceding three paragraphs, the received observation may include at least one of an identity of the collaborator, a movement of the collaborator, a posture of the collaborator, or a determined level of attention of the collaborator to the task collaboration. Furthermore, in addition to or in combination with any one of the features of this and/or the preceding three paragraphs, the processor 710 may be configured to determine the determined level of attention based on at least one of an eye movement of the collaborator, a facial expression of the collaborator, a hand position of the collaborator, a head position of the collaborator, the movement of the collaborator, the posture of the collaborator, or a gaze direction of the collaborator.

Furthermore, in addition to or in combination with any one of the features of this and/or the preceding four paragraphs, the received observation may include sensor data indicative of the received observation, wherein the processor 710 may be configured to receive the sensor data from a sensor 720 including at least one of a camera, a depth sensor, a light detection and ranging sensor, an infrared sensor, or an ultrasonic sensor. Furthermore, in addition to or in combination with any one of the features of this and/or the preceding four paragraphs, the received observation may be received from a server that is remote to the robot. Furthermore, in addition to or in combination with any one of the features of this and/or the preceding four paragraphs, the processor 710 may be configured to determine the received observation from a learning model of collaborator attributes. Furthermore, in addition to or in combination with any one of the features of this and/or the preceding four paragraphs, the device may further include the sensor 720. Furthermore, in addition to or in combination with any one of the features of this and/or the preceding four paragraphs, the movement plan may further include a speed for the robot to move the manipulator to the collaboration position, wherein the processor 710 may be configured to determine the speed based on a received observation of the collaborator.

Furthermore, in addition to or in combination with any one of the features of this and/or the preceding five paragraphs, the movement plan may further include a trajectory for the robot to move the manipulator to the collaboration position, wherein the processor 710 may be configured to determine the trajectory based on a received observation of the collaborator. Furthermore, in addition to or in combination with any one of the features of this and/or the preceding five paragraphs, the movement plan may further include an indication signal associated with the new collaboration position, wherein the processor 710 may be configured to determine the indication signal based on a difference between the new collaboration position and the collaboration position. Furthermore, in addition to or in combination with any one of the features of this and/or the preceding five paragraphs, the indication signal may include at least one of an indicator light, an audible message, or a visually-displayed message. Furthermore, in addition to or in combination with any one of the features of this and/or the preceding five paragraphs, the collaboration policy may include a heuristic policy, wherein the processor 710 may be configured to select the new collaboration position based on a predefined sequence of predetermined collaboration positions.

Furthermore, in addition to or in combination with any one of the features of this and/or the preceding six paragraphs, the processor 710 may be configured to select the predefined sequence of predetermined collaboration positions based on a received observation of the collaborator. Furthermore, in addition to or in combination with any one of the features of this and/or the preceding six paragraphs, the received observation may be indicative of at least one of a height of the collaborator or an arm length of the collaborator. Furthermore, in addition to or in combination with any one of the features of this and/or the preceding six paragraphs, the processor 710 may be further configured to determine a set of exercise instructions for the collaborator, wherein the processor 710 may be configured to suspend the movement plan until the collaborator has completed the exercise instructions. Furthermore, in addition to or in combination with any one of the features of this and/or the preceding six paragraphs, the set of exercise instructions may include a corresponding set of exercise teaching movements of the robot that indicate how the collaborator is to follow the exercise instructions. Furthermore, in addition to or in combination with any one of the features of this and/or the preceding six paragraphs, the processor 710 may be configured to determine that the collaborator has completed the exercise instructions based on a received observation of the collaborator that indicates the collaborator has followed the exercise instructions.

Furthermore, in addition to or in combination with any one of the features of this and/or the preceding seven paragraphs, the device may be incorporated into the robot. Furthermore, in addition to or in combination with any one of the features of this and/or the preceding seven paragraphs, the device may be remote from the robot. Furthermore, in addition to or in combination with any one of the features of this and/or the preceding seven paragraphs, the task collaboration may include a plurality of work tasks to be distributed between the robot and the collaborator, wherein the processor 710 may be configured to assign each work task of the plurality of work tasks to either the robot or the collaborator based on a confidence score of completing a work goal associated with the plurality of work tasks. Furthermore, in addition to or in combination with any one of the features of this and/or the preceding seven paragraphs, the processor 710 may be configured to determine the confidence score based on sensor data indicative of at least one of visual images of a work area of the task collaboration, an environmental status of the work area, a collaborator activity status of the collaborator during the task collaboration, or a robot activity status of the robot during the task collaboration.

Furthermore, in addition to or in combination with any one of the features of this and/or the preceding eight paragraphs, the processor 710 may be configured to determine the confidence score based on a performance rating of the collaborator with respect to each work task and a performance rating of the robot with respect to each work task. Furthermore, in addition to or in combination with any one of the features of this and/or the preceding eight paragraphs, the processor 710 may be configured to receive the sensor data from a sensor 720, wherein the sensor 720 may include at least one of a camera sensor, a light ranging and detection sensor, an audio sensor, an environmental sensor, a health-monitoring sensor, a heart-rate monitor, a motion sensor, a gyroscopic sensor, an accelerometer, or an ultrasonic senor. Furthermore, in addition to or in combination with any one of the features of this and/or the preceding eight paragraphs, the processor 710 may be configured to determine the confidence score based on an expected time to complete the work goal compared to an actual time to complete the work goal. Furthermore, in addition to or in combination with any one of the features of this and/or the preceding eight paragraphs, the processor 710 may be configured to determine the confidence score based on a learning model of attributes of at least one of the robot, the collaborator, the work task, or the work goal.

Figure 8:
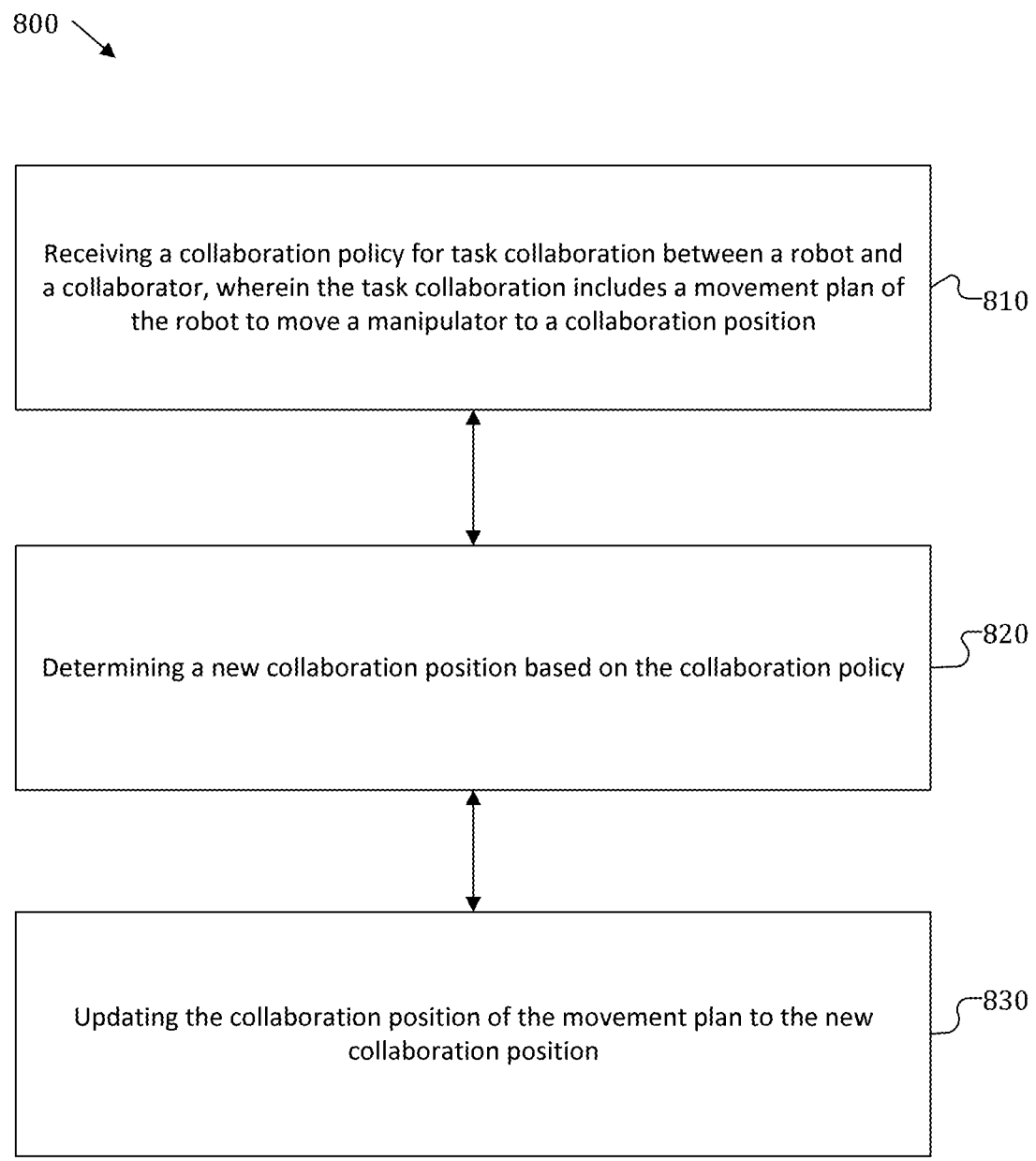
FIG. 8 depicts an exemplary schematic flow diagram of a method for improving the safety of human-robot collaborative tasks.

FIG. 8 depicts a schematic flow diagram of a method 800 for improving the safety of human-robot collaborative tasks. Method 800 may implement any of the safety system features described above with respect to robot safety system 300, robot safety system 600, and/or device 700.

Method 800 includes, in 810, receiving a collaboration policy for task collaboration between a robot and a collaborator, wherein the task collaboration includes a movement plan of the robot to move a manipulator to a collaboration position. Method 800 also includes, in 820, determining a new collaboration position based on the collaboration policy. Method 800 also includes, in 830, updating the collaboration position of the movement plan to the new collaboration position.

In the following, various examples are provided that may include one or more aspects described above with reference to robot safety system 300, robot safety system 600, and/or device 700. The examples provided in relation to the devices may apply also to the described method(s), and vice versa.

Example 1 is a device that includes a processor configured to receive a collaboration policy for task collaboration between a robot and a collaborator, wherein the task collaboration includes a movement plan of the robot to move a manipulator to a collaboration position. The processor is also configured to determine a new collaboration position based on the collaboration policy. The processor is also configured to update the collaboration position of the movement plan to the new collaboration position.

Example 2 is the device of example 1, wherein the collaboration policy includes a randomization policy, wherein the processor is configured to select the new collaboration position from predetermined collaboration positions within a collaboration region defined by a spatial dimension corresponding to a degree of freedom of the manipulator.

Example 3 is the device of example 2, wherein the processor is configured to select the new collaboration position based on a random distribution of the predetermined collaboration positions within the collaboration region.

Example 4 is the device of example 3, wherein the random distribution includes an equal distribution of the predetermined collaboration positions along the spatial dimension from a maximum value of the spatial dimension to a minimum value of the spatial dimension.

Example 5 is the device of either of examples 3 or 4, wherein the random distribution includes a gaussian distribution of the predetermined collaboration positions along the spatial dimension from a maximum value of the spatial dimension to a minimum value of the spatial dimension.

Example 6 is the device of any one of examples 3 to 5, wherein the random distribution includes a multimodal distribution of the predetermined collaboration positions along the spatial dimension, centered at two different center positions along the spatial dimension.

Example 7 is the device of any one of examples 2 to 6, wherein the collaboration region is defined by a plurality of spatial dimensions, wherein each spatial dimension corresponds to a unique degree of freedom of the manipulator, and wherein the processor is configured to select the new collaboration position from the predetermined collaboration positions based on a random distribution of the predetermined collaboration positions along each spatial dimension of the plurality of spatial dimensions.

Example 8 is the device of any one of examples 1 to 7, wherein the collaboration policy includes a monitoring policy, wherein the processor is configured to determine the new collaboration location based on a received observation of the collaborator during task collaboration.

Example 9 is the device of example 8, wherein the processor configured to determine the new collaboration position based on the received observation of the collaborator includes the processor configured to determine a risk score based on the received observation, wherein the risk score is indicative of an occupational safety of the collaborator with respect to the task collaboration, wherein the processor is configured to select the new collaboration position based on the risk score.

Example 10 is the device of either of examples 8 or 9, wherein the received observation includes at least one of an identity of the collaborator, a movement of the collaborator, a posture of the collaborator, or a determined level of attention of the collaborator to the task collaboration.

Example 11 is the device of example 10, wherein the processor is configured to determine the determined level of attention based on at least one of an eye movement of the collaborator, a facial expression of the collaborator, a hand position of the collaborator, a head position of the collaborator, the movement of the collaborator, the posture of the collaborator, or a gaze direction of the collaborator.

Example 12 is the device of any one of examples 8 to 11, wherein the received observation includes sensor data indicative of the received observation, wherein the processor is configured to receive the sensor data from a sensor including at least one of a camera, a depth sensor, a light detection and ranging sensor, an infrared sensor, or an ultrasonic sensor.

Example 13 is the device of any one of examples 8 to 12, wherein the received observation is received from a server that is remote to the robot.

Example 14 is the device of any one of examples 8 to 13, wherein the processor is configured to determine the received observation from a learning model of collaborator attributes.

Example 15 is the device of any one of examples 12 to 14, wherein the device further includes the sensor.

Example 16 is the device of any one of examples 1 to 15, wherein the movement plan further includes a speed for the robot to move the manipulator to the collaboration position, wherein the processor is configured to determine the speed based on a received observation of the collaborator.

Example 17 is the device of any one of examples 1 to 16, wherein the movement plan further includes a trajectory for the robot to move the manipulator to the collaboration position, wherein the processor is configured to determine the trajectory based on a received observation of the collaborator.

Example 18 is the device of any one of examples 1, wherein the movement plan further includes an indication signal associated with the new collaboration position, wherein the processor is configured to determine the indication signal based on a difference between the new collaboration position and the collaboration position.

Example 19 is the device of example 18, wherein the indication signal includes at least one of an indicator light, an audible message, or a visually-displayed message.

Example 20 is the device of any one of examples 1 to 19, wherein the collaboration policy includes a heuristic policy, wherein the processor is configured to select the new collaboration position based on a predefined sequence of predetermined collaboration positions.

Example 21 is the device of example 20, wherein the processor is configured to select the predefined sequence of predetermined collaboration positions based on a received observation of the collaborator.

Example 22 is the device of example 21, wherein the received observation is indicative of at least one of a height of the collaborator or an arm length of the collaborator.

Example 23 is the device of any one of examples 1 to 22, wherein the processor is further configured to determine a set of exercise instructions for the collaborator, wherein the processor is configured to suspend the movement plan until the collaborator has completed the exercise instructions.

Example 24 is the device of example 23, wherein the set of exercise instructions include a corresponding set of exercise teaching movements of the robot that indicate how the collaborator is to follow the exercise instructions.

Example 25 is the device of example 24, wherein the processor is configured to determine that the collaborator has completed the exercise instructions based on a received observation of the collaborator that indicates the collaborator has followed the exercise instructions.

Example 26 is the device of any one of examples 1 to 25, wherein the device is incorporated into the robot.

Example 27 is the device of any one of examples 1 to 26, wherein the device is remote from the robot.

Example 28 is the device of any one of examples 1 to 27, wherein the task collaboration includes a plurality of work tasks to be distributed between the robot and the collaborator, wherein the processor is configured to assign each work task of the plurality of work tasks to either the robot or the collaborator based on a confidence score of completing a work goal associated with the plurality of work tasks.

Example 29 is the device of 28, wherein the processor is configured to determine the confidence score based on sensor data indicative of at least one of visual images of a work area of the task collaboration, an environmental status of the work area, a collaborator activity status of the collaborator during the task collaboration, or a robot activity status of the robot during the task collaboration.

Example 30 is the device of any one of examples 28 to 29, wherein the processor is configured to determine the confidence score based on a performance rating of the collaborator with respect to each work task and a performance rating of the robot with respect to each work task.

Example 31 is the device of any one of examples 28 to 30, wherein the processor is configured to receive the sensor data from a sensor, wherein the sensor includes at least one of a camera sensor, a light ranging and detection sensor, an audio sensor, an environmental sensor, a health-monitoring sensor, a heart-rate monitor, a motion sensor, a gyroscopic sensor, an accelerometer, or an ultrasonic senor.

Example 32 is the device of any one of examples 28 to 31, wherein the processor is configured to determine the confidence score based on an expected time to complete the work goal compared to an actual time to complete the work goal.

Example 33 is the device of any one of examples 28 to 32, wherein the processor is configured to determine the confidence score based on a learning model of attributes of at least one of the robot, the collaborator, the work task, or the work goal.

Example 34 is the device of any one of examples 28 to 33, wherein the processor is configured to automatically update the learning model based on current observations of the task collaboration.

Example 35 is a method that includes receiving a collaboration policy for task collaboration between a robot and a collaborator, wherein the task collaboration includes a movement plan of the robot to move a manipulator to a collaboration position. The method also includes determining a new collaboration position based on the collaboration policy. The method also includes updating the collaboration position of the movement plan to the new collaboration position.

Example 36 is the method of example 35, wherein the collaboration policy includes a randomization policy, wherein the method further includes selecting the new collaboration position from predetermined collaboration positions within a collaboration region defined by a spatial dimension corresponding to a degree of freedom of the manipulator.

Example 37 is the method of example 36, wherein the method includes selecting the new collaboration position based on a random distribution of the predetermined collaboration positions within the collaboration region.

Example 38 is the method of example 37, wherein the random distribution includes an equal distribution of the predetermined collaboration positions along the spatial dimension from a maximum value of the spatial dimension to a minimum value of the spatial dimension.

Example 39 is the method of either of examples 37 or 38, wherein the random distribution includes a gaussian distribution of the predetermined collaboration positions along the spatial dimension from a maximum value of the spatial dimension to a minimum value of the spatial dimension.

Example 40 is the method of any one of examples 37 to 39, wherein the random distribution includes a multimodal distribution of the predetermined collaboration positions along the spatial dimension, centered at two different center positions along the spatial dimension.

Example 41 is the method of any one of examples 36 to 40, wherein the collaboration region is defined by a plurality of spatial dimensions, wherein each spatial dimension corresponds to a unique degree of freedom of the manipulator, and wherein the method also includes selecting the new collaboration position from the predetermined collaboration positions based on a random distribution of the predetermined collaboration positions along each spatial dimension of the plurality of spatial dimensions.

Example 42 is the method of any one of examples 35 to 41, wherein the collaboration policy includes a monitoring policy, wherein the method further includes determining the new collaboration location based on a received observation of the collaborator during task collaboration.

Example 43 is the method of example 42, wherein the determining the new collaboration position based on the received observation of the collaborator includes determining a risk score based on the received observation, wherein the risk score is indicative of an occupational safety of the collaborator with respect to the task collaboration, wherein the method further includes selecting the new collaboration position based on the risk score.

Example 44 is the method of either of examples 42 or 43, wherein the received observation includes at least one of an identity of the collaborator, a movement of the collaborator, a posture of the collaborator, or a determined level of attention of the collaborator to the task collaboration.

Example 45 is the method of example 44, wherein the method also includes determining the determined level of attention based on at least one of an eye movement of the collaborator, a facial expression of the collaborator, a hand position of the collaborator, a head position of the collaborator, the movement of the collaborator, the posture of the collaborator, or a gaze direction of the collaborator.

Example 46 is the method of any one of examples 42 to 45, wherein the received observation includes sensor data indicative of the received observation, wherein the method further includes receiving the sensor data from a sensor including at least one of a camera, a depth sensor, a light detection and ranging sensor, an infrared sensor, or an ultrasonic sensor.

Example 47 is the method of any one of examples 42 to 46, further including receiving the received observation from a server that is remote to the robot.

Example 48 is the method of any one of examples 42 to 47, further including determining the received observation from a learning model of collaborator attributes.

Example 49 is the method of any one of examples 35 to 48, wherein the movement plan further includes a speed for the robot to move the manipulator to the collaboration position, wherein the method further includes determining the speed based on a received observation of the collaborator.

Example 50 is the method of any one of examples 35 to 49, wherein the movement plan further includes a trajectory for the robot to move the manipulator to the collaboration position, wherein the method further includes determining the trajectory based on a received observation of the collaborator.

Example 51 is the method of any one of examples 35, wherein the movement plan further includes an indication signal associated with the new collaboration position, wherein the method further includes determining the indication signal based on a difference between the new collaboration position and the collaboration position.

Example 52 is the method of example 51, wherein the indication signal includes at least one of an indicator light, an audible message, or a visually-displayed message.

Example 53 is the method of any one of examples 35 to 52, wherein the collaboration policy includes a heuristic policy, wherein the method further includes selecting the new collaboration position based on a predefined sequence of predetermined collaboration positions.

Example 54 is the method of example 53, further including selecting the predefined sequence of predetermined collaboration positions based on a received observation of the collaborator.

Example 55 is the method of example 54, wherein the received observation is indicative of at least one of a height of the collaborator or an arm length of the collaborator.

Example 56 is the method of any one of examples 35 to 55, further including determining a set of exercise instructions for the collaborator, wherein the method further includes suspending the movement plan until the collaborator has completed the exercise instructions.

Example 57 is the method of example 56, wherein the set of exercise instructions include a corresponding set of exercise teaching movements of the robot that indicate how the collaborator is to follow the exercise instructions.

Example 58 is the method of example 57, further including determining that the collaborator has completed the exercise instructions based on a received observation of the collaborator that indicates the collaborator has followed the exercise instructions.

Example 59 is the method of any one of examples 35 to 58, wherein the task collaboration includes a plurality of work tasks to be distributed between the robot and the collaborator, wherein the method further includes assigning each work task of the plurality of work tasks to either the robot or the collaborator based on a confidence score of completing a work goal associated with the plurality of work tasks.

Example 60 is the method of 59, further including determining the confidence score based on sensor data indicative of at least one of visual images of a work area of the task collaboration, an environmental status of the work area, a collaborator activity status of the collaborator during the task collaboration, or a robot activity status of the robot during the task collaboration.

Example 61 is the method of any one of examples 59 to 60, further including determining the confidence score based on a performance rating of the collaborator with respect to each work task and a performance rating of the robot with respect to each work task.

Example 62 is the method of any one of examples 59 to 61, further including receiving the sensor data from a sensor, wherein the sensor includes at least one of a camera sensor, a light ranging and detection sensor, an audio sensor, an environmental sensor, a health-monitoring sensor, a heart-rate monitor, a motion sensor, a gyroscopic sensor, an accelerometer, or an ultrasonic senor.

Example 63 is the method of any one of examples 59 to 62, further including determining the confidence score based on an expected time to complete the work goal compared to an actual time to complete the work goal.

Example 64 is the method of any one of examples 59 to 63, further including determining the confidence score based on a learning model of attributes of at least one of the robot, the collaborator, the work task, or the work goal.

Example 65 is a device that includes a means for receiving a collaboration policy for task collaboration between a robot and a collaborator, wherein the task collaboration includes a movement plan of the robot to move a manipulator to a collaboration position. The device also includes a means for determining a new collaboration position based on the collaboration policy. The device also includes a means for updating the collaboration position of the movement plan to the new collaboration position.

Example 66 is the device of example 65, wherein the collaboration policy includes a randomization policy, wherein the device also includes a means for selecting the new collaboration position from predetermined collaboration positions within a collaboration region defined by a spatial dimension corresponding to a degree of freedom of the manipulator.

Example 67 is the device of example 66, wherein the device also includes a means for selecting the new collaboration position based on a random distribution of the predetermined collaboration positions within the collaboration region.

Example 68 is the device of example 67, wherein the random distribution includes an equal distribution of the predetermined collaboration positions along the spatial dimension from a maximum value of the spatial dimension to a minimum value of the spatial dimension.

Example 69 is the device of either of examples 67 or 68, wherein the random distribution includes a gaussian distribution of the predetermined collaboration positions along the spatial dimension from a maximum value of the spatial dimension to a minimum value of the spatial dimension.

Example 70 is the device of any one of examples 67 to 69, wherein the random distribution includes a multimodal distribution of the predetermined collaboration positions along the spatial dimension, centered at two different center positions along the spatial dimension.

Example 71 is the device of any one of examples 66 to 70, wherein the collaboration region is defined by a plurality of spatial dimensions, wherein each spatial dimension corresponds to a unique degree of freedom of the manipulator, and wherein the device also includes a means for selecting the new collaboration position from the predetermined collaboration positions based on a random distribution of the predetermined collaboration positions along each spatial dimension of the plurality of spatial dimensions.

Example 72 is the device of any one of examples 65 to 71, wherein the collaboration policy includes a monitoring policy, wherein the device also includes a means for determining the new collaboration location based on a received observation of the collaborator during task collaboration.

Example 73 is the device of example 72, wherein the means for determining the new collaboration position based on the received observation of the collaborator includes a means for determining a risk score based on the received observation, wherein the risk score is indicative of an occupational safety of the collaborator with respect to the task collaboration, wherein the device also includes a means for selecting the new collaboration position based on the risk score.

Example 74 is the device of either of examples 72 or 73, wherein the received observation includes at least one of an identity of the collaborator, a movement of the collaborator, a posture of the collaborator, or a determined level of attention of the collaborator to the task collaboration.

Example 75 is the device of example 74, wherein the device also includes a means for determining the determined level of attention based on at least one of an eye movement of the collaborator, a facial expression of the collaborator, a hand position of the collaborator, a head position of the collaborator, the movement of the collaborator, the posture of the collaborator, or a gaze direction of the collaborator.

Example 76 is the device of any one of examples 72 to 75, wherein the received observation includes sensor data indicative of the received observation, wherein the device also includes a means for receiving the sensor data from a sensing means that includes at least one of a camera, a depth sensor, a light detection and ranging sensor, an infrared sensor, or an ultrasonic sensor.

Example 77 is the device of any one of examples 72 to 76, device also includes a means for receiving the received observation from a server that is remote to the robot.

Example 78 is the device of any one of examples 72 to 77, the device also includes a means for determining the received observation from a learning model of collaborator attributes.

Example 79 is the device of any one of examples 76 to 78, wherein the device further includes the sensing means.

Example 80 is the device of any one of examples 65 to 79, wherein the movement plan further includes a speed for the robot to move the manipulator to the collaboration position, wherein the device also includes a means for determining the speed based on a received observation of the collaborator.

Example 81 is the device of any one of examples 65 to 80, wherein the movement plan further includes a trajectory for the robot to move the manipulator to the collaboration position, wherein the device also includes a means for determining the trajectory based on a received observation of the collaborator.

Example 82 is the device of any one of examples 65, wherein the movement plan further includes an indication signal associated with the new collaboration position, wherein the device also includes a means for determining the indication signal based on a difference between the new collaboration position and the collaboration position.

Example 83 is the device of example 82, wherein the indication signal includes at least one of an indicator light, an audible message, or a visually-displayed message.

Example 84 is the device of any one of examples 65 to 83, wherein the collaboration policy includes a heuristic policy, wherein the device also includes a means for selecting the new collaboration position based on a predefined sequence of predetermined collaboration positions.

Example 85 is the device of example 84, wherein the device also includes a means for selecting the predefined sequence of predetermined collaboration positions based on a received observation of the collaborator.

Example 86 is the device of example 85, wherein the received observation is indicative of at least one of a height of the collaborator or an arm length of the collaborator.

Example 87 is the device of any one of examples 65 to 86, wherein the device also includes a means for determining a set of exercise instructions for the collaborator, wherein the device also includes a means for suspending the movement plan until the collaborator has completed the exercise instructions.

Example 88 is the device of example 87, wherein the set of exercise instructions include a corresponding set of exercise teaching movements of the robot that indicate how the collaborator is to follow the exercise instructions.

Example 89 is the device of example 88, wherein the device also includes a means for determining that the collaborator has completed the exercise instructions based on a received observation of the collaborator that indicates the collaborator has followed the exercise instructions.

Example 90 is the device of any one of examples 65 to 89, wherein the device is incorporated into the robot.

Example 91 is the device of any one of examples 65 to 90, wherein the device is remote from the robot.

Example 92 is the device of any one of examples 65 to 91, wherein the task collaboration includes a plurality of work tasks to be distributed between the robot and the collaborator, wherein the device also includes a means for assigning each work task of the plurality of work tasks to either the robot or the collaborator based on a confidence score of completing a work goal associated with the plurality of work tasks.

Example 93 is the device of 92, wherein the device also includes a means for determining the confidence score based on sensor data indicative of at least one of visual images of a work area of the task collaboration, an environmental status of the work area, a collaborator activity status of the collaborator during the task collaboration, or a robot activity status of the robot during the task collaboration.

Example 94 is the device of any one of examples 92 to 93, wherein the device also includes a means for determining the confidence score based on a performance rating of the collaborator with respect to each work task and a performance rating of the robot with respect to each work task.

Example 95 is the device of any one of examples 92 to 94, wherein the device also includes a means for receiving the sensor data from a sensing means, wherein the sensing means includes at least one of a camera sensor, a light ranging and detection sensor, an audio sensor, an environmental sensor, a health-monitoring sensor, a heart-rate monitor, a motion sensor, a gyroscopic sensor, an accelerometer, or an ultrasonic senor.

Example 96 is the device of any one of examples 92 to 95, wherein the device also includes a means for determining the confidence score based on an expected time to complete the work goal compared to an actual time to complete the work goal.

Example 97 is the device of any one of examples 92 to 96, wherein the device also includes a means for determining the confidence score based on a learning model of attributes of at least one of the robot, the collaborator, the work task, or the work goal.

Example 98 is a non-transitory computer readable medium, including instructions which, if executed, cause a processor to receive a collaboration policy for task collaboration between a robot and a collaborator, wherein the task collaboration includes a movement plan of the robot to move a manipulator to a collaboration position. The instructions are also configured to cause the processor to determine a new collaboration position based on the collaboration policy. The instructions are also configured to cause the processor to update the collaboration position of the movement plan to the new collaboration position.

Example 99 is the non-transitory computer readable medium of example 98, wherein the collaboration policy includes a randomization policy, wherein the instructions are also configured to cause the processor to select the new collaboration position from predetermined collaboration positions within a collaboration region defined by a spatial dimension corresponding to a degree of freedom of the manipulator.

Example 100 is the non-transitory computer readable medium of example 99, wherein the instructions are also configured to cause the processor to select the new collaboration position based on a random distribution of the predetermined collaboration positions within the collaboration region.

Example 101 is the non-transitory computer readable medium of example 100, wherein the random distribution includes an equal distribution of the predetermined collaboration positions along the spatial dimension from a maximum value of the spatial dimension to a minimum value of the spatial dimension.

Example 102 is the non-transitory computer readable medium of either of examples 100 or 101, wherein the random distribution includes a gaussian distribution of the predetermined collaboration positions along the spatial dimension from a maximum value of the spatial dimension to a minimum value of the spatial dimension.

Example 103 is the non-transitory computer readable medium of any one of examples 100 to 102, wherein the random distribution includes a multimodal distribution of the predetermined collaboration positions along the spatial dimension, centered at two different center positions along the spatial dimension.

Example 104 is the non-transitory computer readable medium of any one of examples 99 to 103, wherein the collaboration region is defined by a plurality of spatial dimensions, wherein each spatial dimension corresponds to a unique degree of freedom of the manipulator, and wherein the processor is configured to select the new collaboration position from the predetermined collaboration positions based on a random distribution of the predetermined collaboration positions along each spatial dimension of the plurality of spatial dimensions.

Example 105 is the non-transitory computer readable medium of any one of examples 98 to 104, wherein the collaboration policy includes a monitoring policy, wherein the instructions are also configured to cause the processor to determine the new collaboration location based on a received observation of the collaborator during task collaboration.

Example 106 is the non-transitory computer readable medium of example 105, wherein the instructions configured to cause the processor to determine the new collaboration position based on the received observation of the collaborator includes the instructions configured to cause the processor to determine a risk score based on the received observation, wherein the risk score is indicative of an occupational safety of the collaborator with respect to the task collaboration, wherein the instructions are also configured to cause the processor to select the new collaboration position based on the risk score.

Example 107 is the non-transitory computer readable medium of either of examples 105 or 106, wherein the received observation includes at least one of an identity of the collaborator, a movement of the collaborator, a posture of the collaborator, or a determined level of attention of the collaborator to the task collaboration.

Example 108 is the non-transitory computer readable medium of example 107, wherein the instructions are also configured to cause the processor to determine the determined level of attention based on at least one of an eye movement of the collaborator, a facial expression of the collaborator, a hand position of the collaborator, a head position of the collaborator, the movement of the collaborator, the posture of the collaborator, or a gaze direction of the collaborator.

Example 109 is the non-transitory computer readable medium of any one of examples 105 to 108, wherein the received observation includes sensor data indicative of the received observation, wherein the instructions are configured to cause the processor to receive the sensor data from a sensor including at least one of a camera, a depth sensor, a light detection and ranging sensor, an infrared sensor, or an ultrasonic sensor.

Example 110 is the non-transitory computer readable medium of any one of examples 105 to 109, wherein the instructions are also configured to cause the processor to receive the received observation from a server that is remote to the robot.

Example 111 is the non-transitory computer readable medium of any one of examples 105 to 110, wherein the instructions are also configured to cause the processor to determine the received observation from a learning model of collaborator attributes.

Example 112 is the non-transitory computer readable medium of any one of examples 109 to 111, wherein the non-transitory computer readable medium further includes the sensor.

Example 113 is the non-transitory computer readable medium of any one of examples 98 to 112, wherein the movement plan further includes a speed for the robot to move the manipulator to the collaboration position, wherein the processor is configured to determine the speed based on a received observation of the collaborator.

Example 114 is the non-transitory computer readable medium of any one of examples 98 to 113, wherein the movement plan further includes a trajectory for the robot to move the manipulator to the collaboration position, wherein the instructions are also configured to cause the processor to determine the trajectory based on a received observation of the collaborator.

Example 115 is the non-transitory computer readable medium of any one of examples 98, wherein the movement plan further includes an indication signal associated with the new collaboration position, wherein the instructions are also configured to cause the processor to determine the indication signal based on a difference between the new collaboration position and the collaboration position.

Example 116 is the non-transitory computer readable medium of example 115, wherein the indication signal includes at least one of an indicator light, an audible message, or a visually-displayed message.

Example 117 is the non-transitory computer readable medium of any one of examples 98 to 116, wherein the collaboration policy includes a heuristic policy, wherein the processor is configured to select the new collaboration position based on a predefined sequence of predetermined collaboration positions.

Example 118 is the non-transitory computer readable medium of example 117, wherein the instructions are also configured to cause the processor to select the predefined sequence of predetermined collaboration positions based on a received observation of the collaborator.

Example 119 is the non-transitory computer readable medium of example 118, wherein the received observation is indicative of at least one of a height of the collaborator or an arm length of the collaborator.

Example 120 is the non-transitory computer readable medium of any one of examples 98 to 119, wherein the processor is further configured to determine a set of exercise instructions for the collaborator, wherein the instructions are also configured to cause the processor to suspend the movement plan until the collaborator has completed the exercise instructions.

Example 121 is the non-transitory computer readable medium of example 120, wherein the set of exercise instructions include a corresponding set of exercise teaching movements of the robot that indicate how the collaborator is to follow the exercise instructions.

Example 122 is the non-transitory computer readable medium of example 121, wherein the instructions are also configured to cause the processor to determine that the collaborator has completed the exercise instructions based on a received observation of the collaborator that indicates the collaborator has followed the exercise instructions.

Example 123 is the non-transitory computer readable medium of any one of examples 98 to 122, wherein the non-transitory computer readable medium is incorporated into the robot.

Example 124 is the non-transitory computer readable medium of any one of examples 98 to 123, wherein the non-transitory computer readable medium is remote from the robot.

Example 125 is the non-transitory computer readable medium of any one of examples 98 to 124, wherein the task collaboration includes a plurality of work tasks to be distributed between the robot and the collaborator, wherein the instructions are also configured to cause the processor to assign each work task of the plurality of work tasks to either the robot or the collaborator based on a confidence score of completing a work goal associated with the plurality of work tasks.

Example 126 is the non-transitory computer readable medium of 125, wherein the processor is configured to determine the confidence score based on sensor data indicative of at least one of visual images of a work area of the task collaboration, an environmental status of the work area, a collaborator activity status of the collaborator during the task collaboration, or a robot activity status of the robot during the task collaboration.

Example 127 is the non-transitory computer readable medium of any one of examples 125 to 126, wherein the instructions are also configured to cause the processor to determine the confidence score based on a performance rating of the collaborator with respect to each work task and a performance rating of the robot with respect to each work task.

Example 128 is the non-transitory computer readable medium of any one of examples 125 to 127, wherein the instructions are also configured to cause the processor to receive the sensor data from a sensor, wherein the sensor includes at least one of a camera sensor, a light ranging and detection sensor, an audio sensor, an environmental sensor, a health-monitoring sensor, a heart-rate monitor, a motion sensor, a gyroscopic sensor, an accelerometer, or an ultrasonic senor.

Example 129 is the non-transitory computer readable medium of any one of examples 125 to 128, wherein the instructions are also configured to cause the processor to determine the confidence score based on an expected time to complete the work goal compared to an actual time to complete the work goal.

Example 130 is the non-transitory computer readable medium of any one of examples 125 to 129, wherein the instructions are also configured to cause the processor to determine the confidence score based on a learning model of attributes of at least one of the robot, the collaborator, the work task, or the work goal.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising:
a processor configured to:
receive a collaboration policy for task collaboration between a robot and a collaborator, wherein the task collaboration comprises a movement plan of the robot to move a manipulator to a collaboration position;
determine a new collaboration position based on the collaboration policy, wherein the collaboration policy comprises a randomization policy, wherein the processor is configured to select the new collaboration position from predetermined collaboration positions within a collaboration region defined by a spatial dimension corresponding to a degree of freedom of the manipulator, wherein the processor is configured to select the new collaboration position based on a random distribution of the predetermined collaboration positions within the collaboration region;
update the collaboration position of the movement plan to the new collaboration position; and
control movements of the manipulator to the new collaboration position based on the movement plan.

2. The device of claim 1, wherein the random distribution comprises at least one of:
an equal distribution of the predetermined collaboration positions along the spatial dimension from a maximum value of the spatial dimension to a minimum value of the spatial dimension;
a gaussian distribution of the predetermined collaboration positions along the spatial dimension from the maximum value to the minimum value; or
a multimodal distribution of the predetermined collaboration positions along the spatial dimension, centered at two different center positions along the spatial dimension.

3. The device of claim 1, wherein the collaboration policy comprises a monitoring policy, wherein the processor is configured to determine the new collaboration position based on a received observation of the collaborator during task collaboration.

4. The device of claim 3, wherein the processor configured to determine the new collaboration position based on the received observation of the collaborator comprises the processor further configured to determine a risk score based on the received observation, wherein the risk score is indicative of an occupational safety of the collaborator with respect to the task collaboration, wherein the processor is configured to select the new collaboration position based on the risk score.

5. The device of claim 3, wherein the received observation comprises at least one of an identity of the collaborator, a movement of the collaborator, a posture of the collaborator, or a determined level of attention of the collaborator to the task collaboration.

6. The device of claim 5, wherein the processor is configured to determine the determined level of attention based on at least one of an eye movement of the collaborator, a facial expression of the collaborator, a hand position of the collaborator, a head position of the collaborator, the movement of the collaborator, the posture of the collaborator, or a gaze direction of the collaborator.

7. The device of claim 3, wherein the received observation comprises sensor data indicative of the received observation, wherein the processor is configured to receive the sensor data from a sensor comprising at least one of a camera, a depth sensor, a light detection and ranging sensor, an infrared sensor, or an ultrasonic sensor.

8. The device of claim 1, wherein the movement plan further comprises a speed for the robot to move the manipulator to the collaboration position, wherein the processor is configured to determine the speed based on a received observation of the collaborator.

9. The device of claim 1, wherein the movement plan further comprises a trajectory for the robot to move the manipulator to the collaboration position, wherein the processor is configured to determine the trajectory based on a received observation of the collaborator.

10. The device of claim 1, wherein the collaboration policy comprises a heuristic policy, wherein the processor is configured to select the new collaboration position based on a predefined sequence of predetermined collaboration positions.

11. The device of claim 10, wherein the processor is configured to select the predefined sequence of predetermined collaboration positions based on a received observation of the collaborator.

12. The device of claim 11, wherein the received observation is indicative of at least one of a height of the collaborator or an arm length of the collaborator.

13. The device of claim 1, wherein the processor is further configured to determine a set of exercise instructions for the collaborator, wherein the processor is configured to suspend the movement plan until the collaborator has completed the exercise instructions.

14. A non-transitory computer readable medium, comprising instructions which, if executed, cause a processor to:
receive a collaboration policy for task collaboration between a robot and a collaborator, wherein the task collaboration comprises a movement plan of the robot to move a manipulator to a collaboration position, wherein the task collaboration further comprises a plurality of work tasks to be distributed between the robot and the collaborator;
determine a new collaboration position based on the collaboration policy, wherein the collaboration policy comprises a randomization policy, wherein the processor is configured to select the new collaboration position from predetermined collaboration positions within a collaboration region defined by a spatial dimension corresponding to a degree of freedom of the manipulator, wherein the processor is configured to select the new collaboration position based on a random distribution of the predetermined collaboration positions within the collaboration region;

update the collaboration position of the movement plan to the new collaboration position; and assign each work task of the plurality of work tasks to either the robot or the collaborator based on a confidence score of completing a work goal associated with the plurality of work tasks; and control movements of the manipulator to the new collaboration position based on the movement plan.

15. The non-transitory computer readable medium of claim 14, wherein the processor is configured to determine the confidence score based on sensor data indicative of at least one of visual images of a work area of the task collaboration, an environmental status of the work area, a collaborator activity status of the collaborator during the task collaboration, or a robot activity status of the robot during the task collaboration.

16. The non-transitory computer readable medium of claim 14, wherein the processor is configured to determine the confidence score based on a performance rating of the collaborator with respect to each work task and a performance rating of the robot with respect to each work task.

17. The non-transitory computer readable medium of claim 14, wherein the processor is configured to determine the confidence score based on an expected time to complete the work goal compared to an actual time to complete the work goal.

18. The non-transitory computer readable medium of claim 14, wherein the processor is configured to determine the confidence score based on a learning model of attributes of at least one of the robot, the collaborator, the work task, or the work goal.

19. An apparatus comprising:

a means for receiving a collaboration policy for task collaboration between a robot and a collaborator, wherein the task collaboration comprises a movement plan of the robot to move a manipulator to a collaboration position;

a means for determining a new collaboration position based on the collaboration policy, wherein the collaboration policy comprises a randomization policy, wherein the means for determining comprises a means for selecting the new collaboration position from predetermined collaboration positions within a collaboration region defined by a spatial dimension corresponding to a degree of freedom of the manipulator, wherein the means for selecting the new collaboration position is based on a random distribution of the predetermined collaboration positions within the collaboration region;

a means for updating the collaboration position of the movement plan to the new collaboration position; and a means for controlling movements of the manipulator to the new collaboration position based on the movement plan.

20. The apparatus of claim 19, wherein the collaboration policy comprises a monitoring policy, wherein the means for determining the new collaboration position is further based on a received observation of the collaborator during task collaboration.

21. The apparatus of claim 20, wherein the means for determining the new collaboration position comprises a means for determining a risk score based on the received observation, wherein the risk score is indicative of an occupational safety of the collaborator with respect to the task collaboration, wherein the apparatus further includes a means for selecting the new collaboration position based on the risk score.

22. The apparatus of claim 20, wherein the received observation comprises at least one of an identity of the collaborator, a movement of the collaborator, a posture of the collaborator, or a determined level of attention of the collaborator to the task collaboration.

* * * * *